(12) United States Patent
Park

(10) Patent No.: US 12,237,541 B2
(45) Date of Patent: Feb. 25, 2025

(54) BATTERY PACK AND METHOD OF MANUFACTURING THE SAME

(71) Applicant: SAMSUNG SDI CO., LTD., Yongin-si (KR)

(72) Inventor: Sanghun Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 2 days.

(21) Appl. No.: 17/667,967

(22) Filed: Feb. 9, 2022

(65) Prior Publication Data

US 2022/0255196 A1 Aug. 11, 2022

(30) Foreign Application Priority Data

Feb. 10, 2021 (KR) .................. 10-2021-0019357

(51) Int. Cl.
| | |
|---|---|
| *H01M 10/00* | (2006.01) |
| *H01M 10/04* | (2006.01) |
| *H01M 10/42* | (2006.01) |
| *H01M 50/202* | (2021.01) |
| *H01M 50/284* | (2021.01) |

(Continued)

(52) U.S. Cl.
CPC ......... *H01M 50/519* (2021.01); *H01M 10/04* (2013.01); *H01M 10/425* (2013.01); *H01M 50/202* (2021.01); *H01M 50/284* (2021.01); *H01M 50/54* (2021.01); *H01M 50/547* (2021.01); *H01M 50/581* (2021.01); *H01M 50/593* (2021.01); *H01M 2200/00* (2013.01)

(58) Field of Classification Search
CPC .. H01M 50/519; H01M 10/04; H01M 10/425; H01M 50/202; H01M 50/54; H01M 50/547; H01M 50/581; H01M 50/593; H01M 2200/00; H01M 10/647; H01M 50/553

See application file for complete search history.

(56) References Cited

U.S. PATENT DOCUMENTS

| | | | |
|---|---|---|---|
| 8,053,103 B2 | 11/2011 | Byun et al. | |
| 9,130,224 B2 | 9/2015 | Lee et al. | |

(Continued)

FOREIGN PATENT DOCUMENTS

| | | | |
|---|---|---|---|
| EP | 1995804 A1 | 11/2008 | |
| EP | 2273588 A1 | 1/2011 | |

(Continued)

OTHER PUBLICATIONS

Machine translation of KR-2014/0050293-A, obtained from PE2E. (Year: 2014).*

(Continued)

*Primary Examiner* — Nicholas P D'Aniello
(74) *Attorney, Agent, or Firm* — Lee IP Law, P.C.

(57) ABSTRACT

A battery pack and a method of manufacturing the battery pack including a battery cell including a terrace portion from which an electrode is drawn out; and a protection module package electrically connected to the battery cell, wherein the protection module package includes an insulating frame including a base portion on the terrace portion of the battery cell, and a first partition wall on the base portion and facing the battery cell, a circuit portion on the insulating frame, and an insulating block covering at least a portion of the circuit portion.

14 Claims, 7 Drawing Sheets

(51) Int. Cl.
   *H01M 50/519* (2021.01)
   *H01M 50/54* (2021.01)
   *H01M 50/547* (2021.01)
   *H01M 50/581* (2021.01)
   *H01M 50/593* (2021.01)

(56) References Cited

U.S. PATENT DOCUMENTS

| | | |
|---|---|---|
| 11,094,972 B2 | 8/2021 | Lee |
| 11,367,922 B2 | 6/2022 | Choi |
| 2012/0009443 A1 | 1/2012 | Baek et al. |
| 2014/0287275 A1 | 9/2014 | Hwang |
| 2016/0028047 A1 | 1/2016 | Park |
| 2016/0141594 A1* | 5/2016 | Hwang .................... H02H 7/18 429/7 |

FOREIGN PATENT DOCUMENTS

| | | |
|---|---|---|
| EP | 3531495 A1 | 8/2019 |
| EP | 3686951 A1 | 7/2020 |
| JP | 2007-280813 A | 10/2007 |
| KR | 2012-0005930 A | 1/2012 |
| KR | 10-2014-0050293 A | 4/2014 |
| KR | 20140050293 A * | 4/2014 |
| KR | 2014-0115756 A | 10/2014 |
| KR | 2015-0038914 A | 4/2015 |
| KR | 10-2016-0013758 A | 2/2016 |
| KR | 2016-0024892 A | 3/2016 |
| KR | 2016-0039790 A | 4/2016 |
| KR | 10-2017674 B1 | 8/2019 |
| KR | 10-2020-0002416 A | 1/2020 |

OTHER PUBLICATIONS

Korean Office action dated Oct. 13, 2022.
European Search Report dated Jul. 18, 2022.
EP Invitation pursuant to Rule 137(4) EPC and Article 94(3) EPC dated Jan. 3, 2025 for corresponding EP Patent Application No. 22156111.1.

* cited by examiner

BATTERY PACK AND METHOD OF MANUFACTURING THE SAME

CROSS-REFERENCE TO RELATED APPLICATION

This application is based on and claims priority under 35 U.S.C. § 119 to Korean Patent Application No. 10-2021-0019357, filed on Feb. 10, 2021, in the Korean Intellectual Property Office, the disclosure of which is incorporated by reference herein in its entirety.

BACKGROUND

1. Field

Embodiments relate to a battery pack and a method of manufacturing the battery pack.

2. Description of the Related Art

In general, secondary batteries are batteries that can be charged and discharged, unlike primary batteries that cannot be recharged. Secondary batteries may be used as energy sources for mobile devices, electric vehicles, hybrid vehicles, electric bicycles, uninterruptible power supply, or the like. Secondary batteries may be used in the form of a single battery or in the form of a module bundled as a unit by connecting a plurality of batteries, depending on the type of external device to be applied.

SUMMARY

The embodiments may be realized by providing a battery pack including a battery cell including a terrace portion from which an electrode is drawn out; and a protection module package electrically connected to the battery cell, wherein the protection module package includes an insulating frame including a base portion on the terrace portion of the battery cell, and a first partition wall on the base portion and facing the battery cell, a circuit portion on the insulating frame, and an insulating block covering at least a portion of the circuit portion.

The base portion may be between the terrace portion and the circuit portion.

The first partition wall may be between a body of the battery cell and the circuit portion.

The base portion, the first partition wall, and the terrace portion may each extend in a first direction in parallel with one another, and the electrode may be drawn out from the terrace portion in a second direction intersecting with the first direction.

The circuit portion may include a circuit board, the circuit board being a support base of the circuit portion, a connection tab on the circuit board and connected to the electrode of the battery cell, and a safety element on the circuit board and connected to the connection tab.

The safety element may be at a central position of the circuit board in a first direction, which is a lengthwise direction of the circuit board, and the connection tab may include a first connection tab and a second connection tab at respective sides of the safety element.

The insulating block may cover the safety element.

The insulating block may be separated from the insulating frame with the circuit board therebetween.

The insulating block may cover an entire outer surface of the safety element except for a bottom of the safety element, which is connected to the circuit board.

The battery pack may further include an input/output line, wherein the circuit board includes a connection region protruding in a second direction intersecting with a first direction, the first direction being a lengthwise direction of the circuit board, and the input/output line is connected to the connection region of the circuit board.

The input/output line may extend between the connection region of the circuit board and the base portion.

The connection region may protrude from a central position of the circuit board, the central position of the circuit board being at a center of the circuit board in the first direction, and the insulating block may cover both the safety element and the connection region.

The insulating frame may further include a second partition wall on the base portion thereof, the second partition wall and the first partition wall together at least partially surrounding the circuit portion.

The electrode of the battery cell may be connected to the circuit portion at a front of the circuit portion, and the first partition wall and the second partition wall may at least partially surround a rear and a side of the circuit portion.

The first partition wall and the second partition wall and the base portion may be connected to each other, surround the rear, the side, and a bottom of the circuit portion, and form an accommodation space for the circuit portion.

The first partition wall may extend in a first direction, and the second partition wall may extend in a second direction, away from the battery cell, from both outer edges of the first partition wall.

The circuit portion may include a connection tab connected to the electrode of the battery cell, and the connection tab may be at a front position of the insulating frame and the first partition wall is at a rear position of the insulating frame relative to a second direction, the second direction intersecting with a first direction, which is a lengthwise direction of the first partition wall.

An avoidance space may be between the connection tab and the first partition wall, which face each other with erected in a third direction intersecting with the first and second directions.

The connection tab may include a fixing piece fixed on a circuit board of the circuit portion, a coupling piece connected to the electrode of the battery cell, and a bending portion connecting the fixing piece to the coupling piece, and the bending portion may be at the front position of the insulating frame.

The embodiments may be realized by providing a method of manufacturing a battery pack including a battery cell including a terrace portion from which an electrode is drawn out, a circuit portion including a connection tab connected to the electrode of the battery cell, and an insulating frame including a base portion on the terrace portion of the battery cell and a first partition wall on the base portion to face the battery cell, the method including connecting the connection tab to the electrode of the battery cell in a state in which the connection tab extends upwardly and faces the first partition wall with an avoidance space between the connection tab and the first partition wall; and bending the connection tab and the electrode of the battery cell, connected to each other, to then be seated on a floor of the avoidance space.

The connection tab may include a fixing piece fixed on a circuit board of the circuit portion, a coupling piece connected to the electrode of the battery cell, and a bending portion connecting the fixing piece to the coupling piece, and bending the connection tab and the electrode of the battery cell may include bending the coupling piece, which has been connected to the electrode of the battery cell, around the bending portion to overlap the fixing piece.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
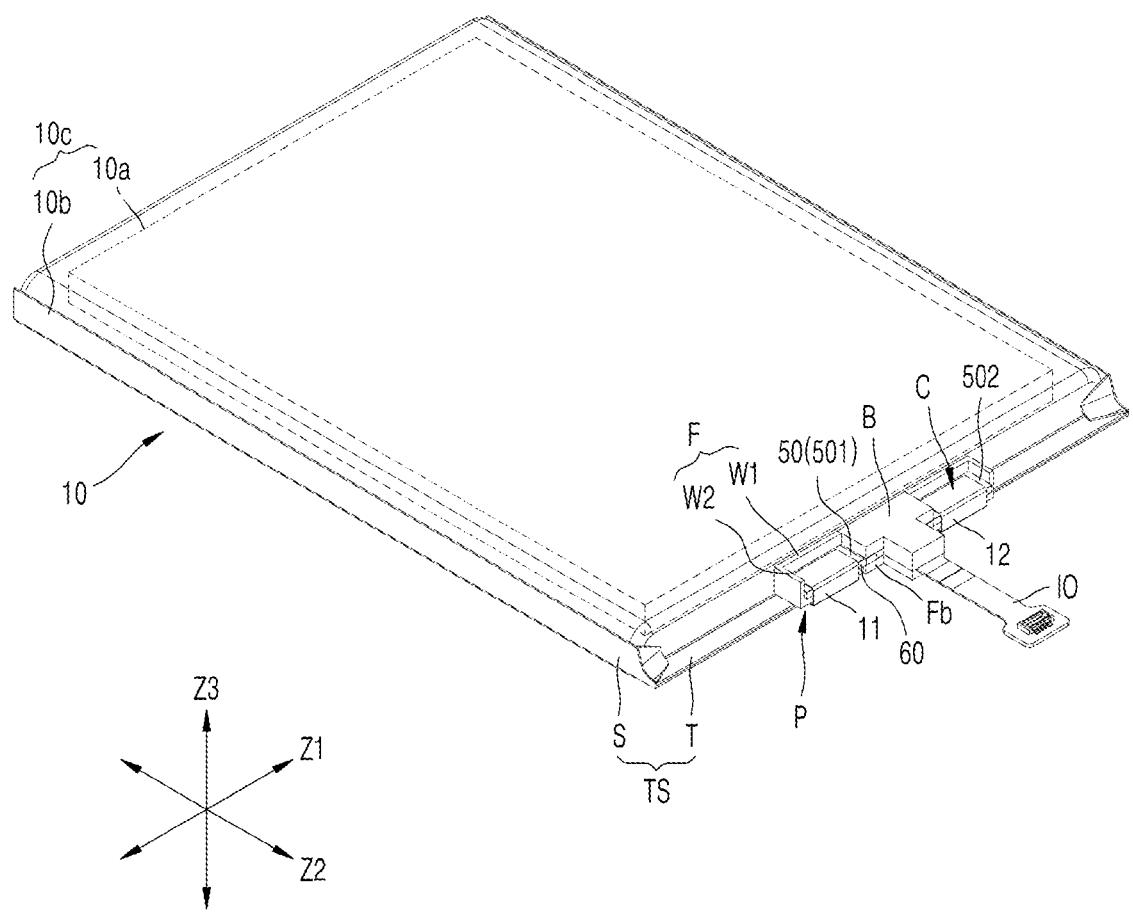
FIG. 1 is a perspective view of a battery pack according to an embodiment of the disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Accordingly, the embodiments are merely described below, by referring to the figures, to explain aspects of the present description. As used herein, the terms "or" and "and/or" are not exclusive terms, and include any and all combinations of one or more of the associated listed items. Expressions such as "at least one of," when preceding a list of elements, modify the entire list of elements and do not modify the individual elements of the list.

Hereinafter, a battery pack according to an embodiment of the disclosure will be described with reference to the accompanying drawings.

Figure 2:
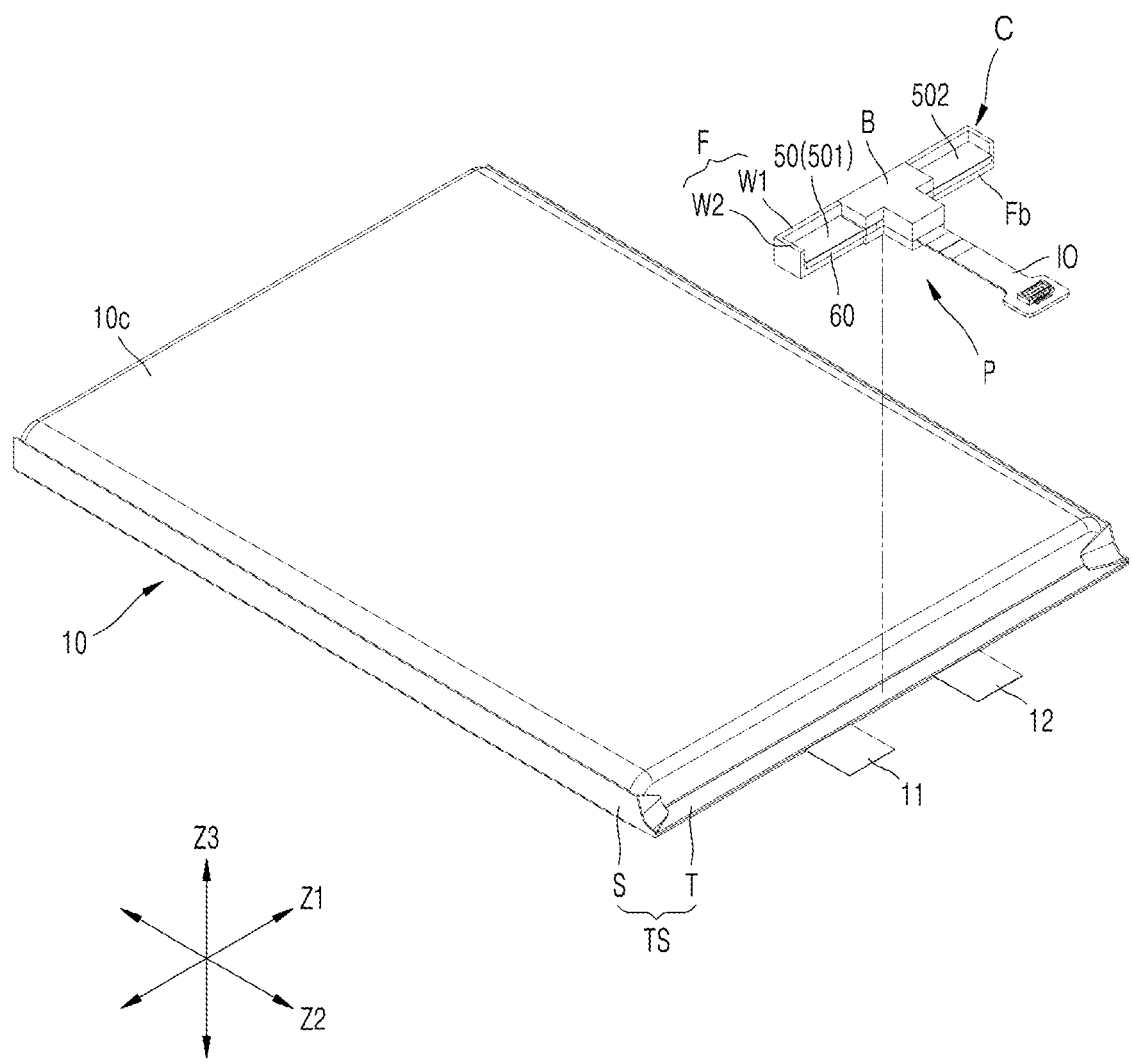
FIG. 2 is an exploded perspective view of the battery pack of FIG. 1.
Figure 3:
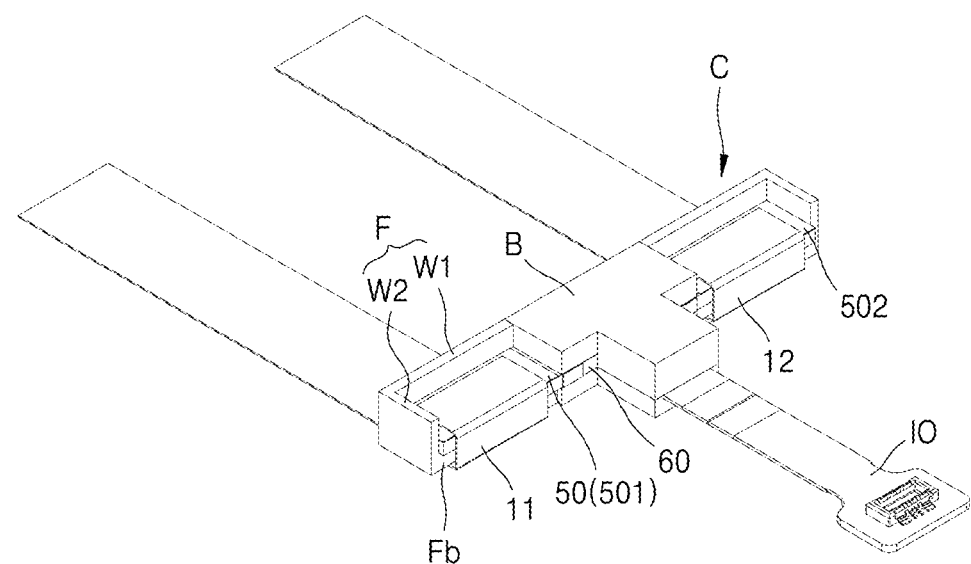
FIGS. 3 and 4 are different perspective views of a connection between a protection module package and a battery cell of FIG. 1.
Figure 4:
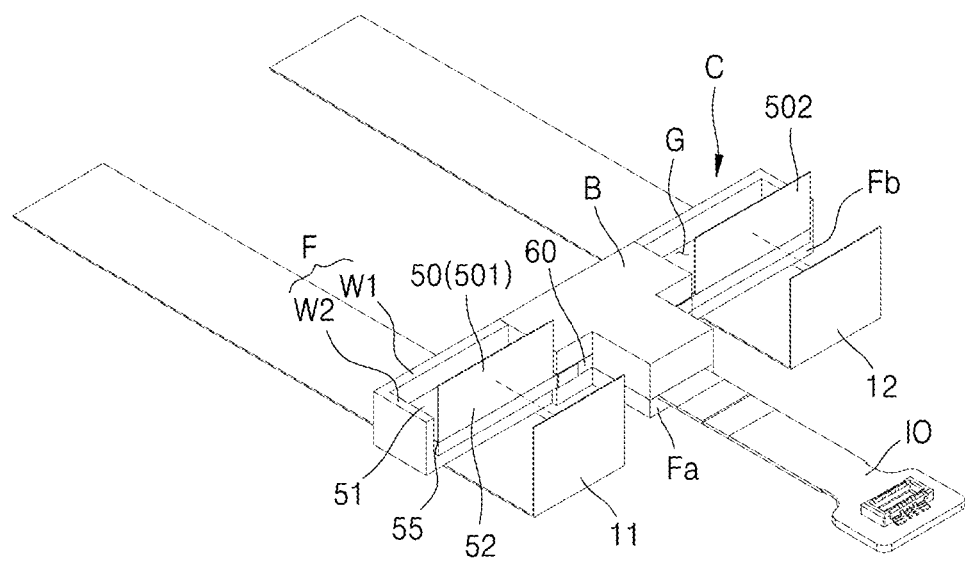
Figure 4:
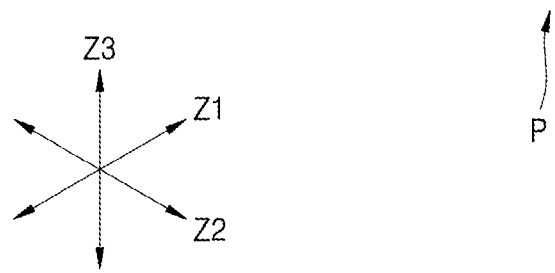
Figure 5:
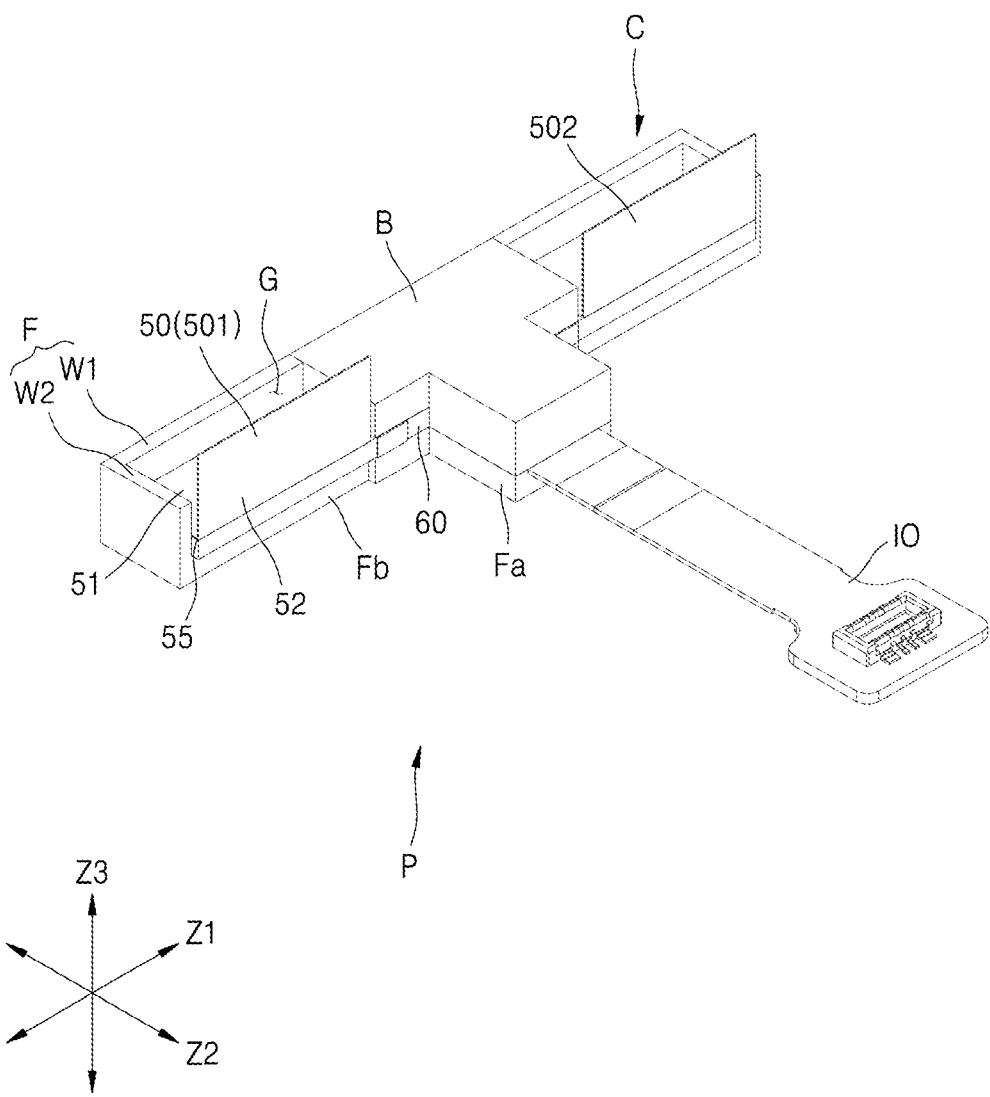
FIG. 5 is a perspective view of the protection module package of FIG. 1.
Figure 6:
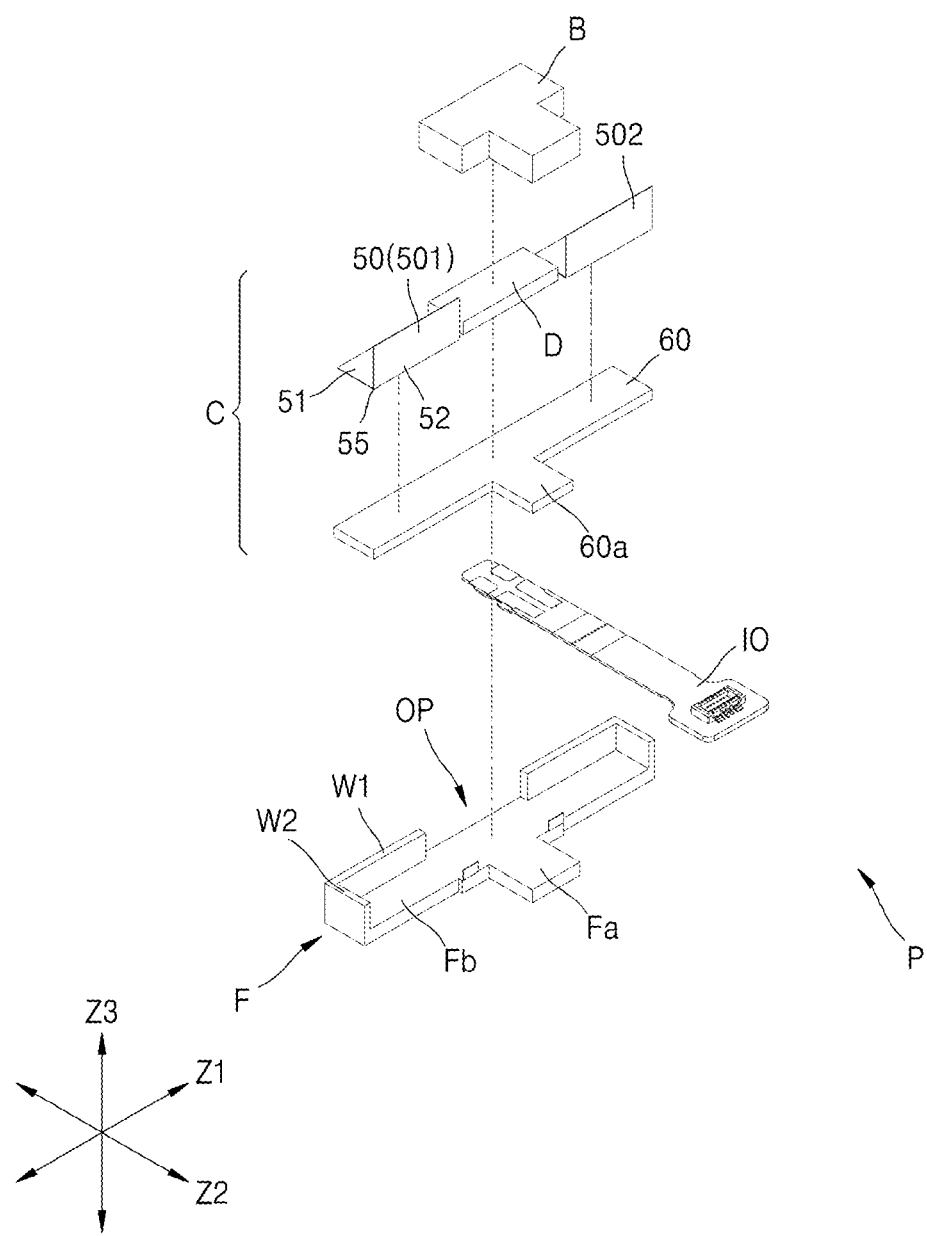
FIGS. 6 and 7 are different exploded perspective views of the protection module package of FIG. 1.
Figure 7:
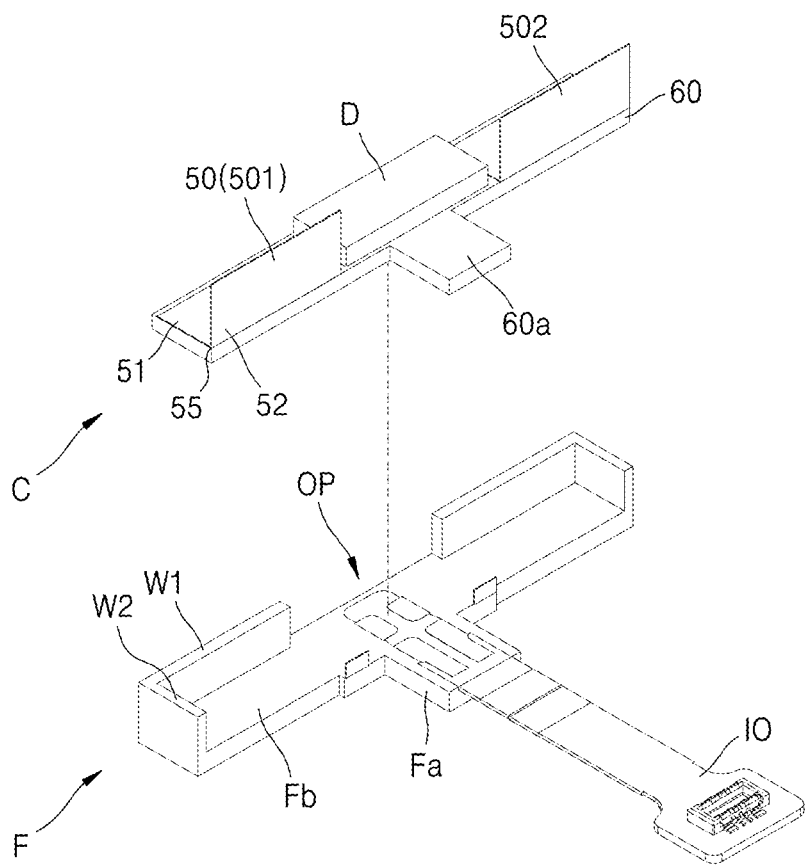

FIG. 1 is a perspective view of a battery pack according to an embodiment of the disclosure. FIG. 2 is an exploded perspective view of the battery pack of FIG. 1. FIGS. 3 and 4 are different perspective views of a connection between a protection module package and a battery cell of FIG. 1. FIG. 5 is a perspective view of the protection module package of FIG. 1. FIGS. 6 and 7 are different exploded perspective views of the protection module package of FIG. 1.

Referring to FIGS. 1 and 2, a battery pack according to an embodiment of the disclosure may include a battery cell 10 including a terrace portion T from which electrodes 11 and 12 are drawn out or extend, and a protection module package P electrically connected to the battery cell 10. The protection module package P may include an insulating frame F including a base portion Fb on the terrace portion T of the battery cell 10 and a first partition wall W1 on the base portion Fb and facing the battery cell 10, a circuit portion C on the insulating frame F, and an insulating block B surrounding at least a portion of the circuit portion C.

The battery cell 10 may include an electrode assembly 10*a*, a casing 10*b* surrounding the electrode assembly 10*a*, and the electrodes 11 and 12 drawn out from the casing 10*b*. In an implementation, the electrode assembly 10*a* may be formed in or as a winding type in which first and second electrode plates, and a separator between the first electrode plate and the second electrode plate, are wound in a roll shape. In an implementation, the electrode assembly 10*a* may be formed in or as a stacked type in which the first and second electrode plates and the separator are stacked on each other. The first and second electrode plates of the electrode assembly 10*a* may be electrically connected to the outside of the casing 10*b* through the electrodes 11 and 12 of the battery cell 10. The electrodes 11 and 12 of the battery cell 10 may be electrically connected to the first and second electrode plates of the electrode assembly 10*a*, respectively, and may include a first electrode (i.e., the electrode 11) and a second electrode (i.e., the electrode 12), which have different polarities. The electrodes 11 and 12 of the battery cell 10 may be drawn out through the terrace portion T, and may be electrically connected to the protection module package P, as will be described below.

The casing 10*b* may surround the electrode assembly 10*a*, and by sealing an excess portion of the casing 10*b* remaining after surrounding the electrode assembly 10*a*, a sealing portion TS for sealing the electrode assembly 10*a* may be formed. In this case, the battery cell 10 may include a body 10*c* including the electrode assembly 10*a* and the casing 10*b* surrounding the electrode assembly 10*a*, and a sealing portion TS formed as a part of the casing 10*b* along the periphery of the body 10*c* for sealing the electrode assembly 10*a*. In this case, the sealing portion TS may include the terrace portion T from which the electrodes 11 and 12 are drawn out, and may include, in addition to the terrace portion T, a side sealing portion S formed along the side of the body 10*c* of the battery cell 10. As will be described later, the protection module package P electrically connected to the battery cell 10 may be seated on the terrace portion T of the battery cell 10. In this case, the seating of the protection module package P on the terrace portion T of the battery cell 10 may mean that components forming the protection module package P, that is, the circuit portion C, the insulating frame F, and the insulating block B, are arranged on the terrace portion T of the battery cell 10. The electrodes 11 and 12 of the battery cell 10 may extend from the body 10*c* of the battery cell 10, e.g., the electrode assembly 10*a* forming the body 10*c* of the battery cell 10, and may be drawn out of the battery cell 10 through the terrace portion T. In an implementation, the electrodes 11 and 12 of the battery cell 10 drawn out of the battery cell 10 may be connected to a connection tab 50 of the circuit portion C.

Referring to FIGS. 3 to 7, the circuit portion C may include a circuit board 60 having a conductive pattern (forming a charge and discharge path) connected to the battery cell 10. The circuit board 60 may provide a support base for the circuit portion C, e.g., a support base for the connection tab 50 and a safety element D on the circuit board 60. In an implementation, the circuit board 60 may provide a charge and discharge path from the connection tab 50 and the safety element D arranged on the circuit board 60 to an input/output line IO connected to the circuit board 60. As will be described below, in an implementation, the circuit portion C may be on the insulating frame F. In this case, the circuit portion C being on the insulating frame F may mean that the circuit board 60 (on which the safety element D and the connection tab 50 are arranged) may be on the insulating frame F.

The connection tab 50 (connected to the electrodes 11 and 12 of the battery cell 10) may be on the circuit board 60. In an implementation, the connection tab 50 may be on at least one side of the safety element D along a first direction Z1. Throughout this specification, the first direction Z1 may correspond to a longitudinal direction of the terrace portion T, and may correspond to a longitudinal direction of the circuit board 60 on the terrace portion T. In an implementation, the first direction Z1 may mean a direction in which the insulating frame F extends (e.g., lengthwise), e.g., a direction in which the base portion Fb and the first partition wall W1 of the insulating frame F extend. In an implementation, the first direction Z1 may correspond to a direction intersecting with a second direction Z2 (in which the electrodes 11 and 12 of the battery cell 10 are drawn out from the terrace portion T). In an implementation, the first direction Z1 and the second direction Z2 may be directions perpendicular to each other.

In an implementation, the connection tab 50 may include first and second connection tabs 501 and 502 on or at both sides of the safety element D in the first direction Z1. The first and second connection tabs 501 and 502 may be electrically connected to the first and second electrodes 11 and 12 of the battery cell 10, respectively. In an implementation, the connection tab 50 may be at both sides of the circuit board 60 with the safety element D as a center, the safety element D being at the central position of the circuit board 60 in the first direction Z1. The connection tab 50 may include the first and second connection tabs 501 and 502 on both sides of the circuit board 60. In an implementation, the first and second connection tabs 501 and 502 may be connected to the first and second electrodes 11 and 12, respectively, while overlapping the first and second electrodes 11 and 12 of the battery cell 10 (which extend to surround the protection module package P). In an implementation, the first and second connection tabs 501 and 502 may be coupled to the first and second electrodes 11 and 12 of the battery cell 10 through welding or the like while overlapping the first and second electrodes 11 and 12 of the battery cell 10.

The connection tab 50 may include a fixing piece 51 fixed on the circuit board 60 and a coupling piece 52 extending from the fixing piece 51 and connected to the electrodes 11 and 12 of the battery cell 10. In an implementation, the fixing piece 51 and the coupling piece 52 may overlap each other through or by a bending portion 55. In an implementation, as will be described below, after the coupling piece 52 is connected to the electrodes 11 and 12 of the battery cell 10 in a state of being erected, e.g., extending upright in a third direction Z3 from the fixing piece 51 through the bending portion 55, the coupling piece 52 may then be bent around or at the bending portion 55 to overlap (e.g., roughly in parallel with) the fixing piece 51 together with the electrodes 11 and 12 of the battery cell 10.

Throughout this specification, the third direction Z3 may correspond to a direction intersecting with the first direction Z1 and the second direction Z2, and in an implementation, the third direction Z3 may correspond to a direction perpendicular to the first direction Z1 and the second direction Z2. In an implementation, the third direction Z3 may refer to a height direction from a plane of the terrace portion T (refer to FIG. 2) formed by the first and second directions Z1 and Z2, a height direction from a plane of the circuit board 60 formed by the first and second directions Z1 and Z2, or a thickness direction of the circuit board 60.

The safety element D may be on the circuit board 60 together with the connection tab 50. In an implementation, the safety element D may be at a central position of the circuit board 60 in the first direction Z1. The safety element D may capture an abnormal state of the battery cell 10, e.g., overheating, overcharging, or overdischarging, and take a protective action. In an implementation, the circuit portion C may include a charge and discharge path connected to the first and second connection tabs 501 and 502, and may control charge and discharge current through the safety element D on or in the charge and discharge path connected selectively to the first connection tabs 501 among the first and second connection tabs 501 and 502. In an implementation, the safety element D may include a variable resistor having a resistance value that changes according to temperature, the variable resistor being on or in the charge and discharge path to block the charge and discharge current when the battery cell 10 is overheated, e.g., above a set temperature.

The circuit portion C may include a charge and discharge path connected to the connection tab 50, and the charge and discharge path connected to the connection tab 50 may be connected to the outside of the battery pack through an external terminal of the input/output line TO. In an implementation, the outside of the battery pack may correspond to an external load receiving discharge power from the battery cell 10 or an external charger supplying charging power toward the battery cell 10.

The input/output line TO may be electrically connected to the circuit board 60 through a connection region 60a of the circuit board 60, and may extend from the circuit board 60 in the second direction Z2. In an implementation, the circuit board 60 may extend (e.g., lengthwise) in the first direction Z1, and the first direction Z1 may correspond to a longitudinal direction of the circuit board 60. The connection region 60a (protruding in the second direction Z2) may be at a central position of the circuit board 60 (relative to the first direction Z1), and the input/output line TO may be connected to the circuit board 60 through the connection region 60a of the circuit board 60. In an implementation, the circuit board 60 may extend in the first direction Z1 (corresponding to the longitudinal direction of the circuit board 60) and may have a substantially T-shape including the connection region 60a protruding in the second direction Z2. In an implementation, the circuit board 60 extending in the first and second directions Z1 and Z2 may be integrally formed.

The connection region 60a of the circuit board 60 may be at a central position of the circuit board 60 in the first direction Z1, and may protrude in the second direction Z2 at or from a position adjacent to the safety element D at the central position of the circuit board 60. As will be described below, the safety element D may be covered with an insulating block B to be insulated and protected from external environment. The insulating block B may cover both the safety element D, arranged adjacently at a central position of the circuit board 60 in the first direction Z1, and the connection region 60a, and may insulate and protect, from the external environment, the safety element D and the connection region 60a to which the input/output line IO is connected. To this end, the insulating block B may include a portion covering the safety element D on the circuit board 60 while extending in the first direction Z1, and a portion covering the connection region 60a of the circuit board 60 that extends in the second direction Z2. The technical configuration of the insulating block (B) will be described below in more detail.

The circuit board 60 may be on the insulating frame F, and the input/output line IO may extend in the second direction Z2 from between the connection region 60a of the circuit board 60 and a protruding region Fa of the insulating frame F. In an implementation, the input/output line IO may be coupled to a surface of the connection region 60a of the circuit board 60, which surface faces the protruding region Fa of the insulating frame F. Thus, the input/output line IO may extend in the second direction Z2 from between the connection region 60a of the circuit board 60 and the protruding region Fa of the insulating frame F. In an implementation, the input/output line IO may extend in the second direction Z2 from the connection region 60a of the circuit board 60, and the insulating frame F may include a protruding region Fa that protrudes in the second direction Z2 to support the input/output line IO and extends parallel to the connection region 60a of the circuit board 60.

The circuit portion C may be on the insulating frame F. In an implementation, the circuit board 60 (providing a support base of the circuit portion C) may be on the insulating frame F, and as the circuit board 60 (in or on which the safety element D and the connection tab 50 are arranged) may be on the insulating frame F, the insulating frame F may support the entire circuit portion C.

The insulating frame F may be on the terrace portion T (refer to FIG. 2) of the battery cell 10. In an implementation, the insulating frame F may extend in the first direction Z1 in parallel with the terrace portion T. In an implementation, as the base portion F and the first partition wall W1 constituting the insulating frame F extend in parallel in the first direction Z1, the insulating frame F may generally extend in the first direction Z1.

The circuit portion C may be on the insulating frame F. In an implementation, the insulating frame F may be between the circuit portion C and the terrace portion T (refer to FIG. 2) of the battery cell 10 while supporting the circuit portion C. In an implementation, the insulating frame F may form or be a support base of the protection module package P, and may form the bottom of the protection module package P in contact with the terrace portion T. In an implementation, the insulating frame F may form the bottom of the protection module package P in contact with the terrace portion T while extending in parallel in the first direction Z1, and may include the base portion Fb that provides insulation of the protection module package P (e.g., the circuit portion C) from the terrace portion T. The base portion Fb may extend in parallel in the first direction Z1 between the circuit portion C or the circuit board 60 and the terrace portion T of the battery cell 10, and the base portion Fb and the circuit board 60 may be sequentially arranged in the third direction Z3 on the terrace portion T (refer to FIG. 2) of the battery cell 10.

In an implementation, the base portion Fb may have a shape corresponding to that of the circuit board 60, e.g., may have a substantially T-shape including a portion extending in the first direction Z1 and a protruding region Fa protruding in the second direction Z2 from a central position in the first direction Z1. The protruding region Fa may extend in parallel with the connection region 60a of the circuit board 60, and the input/output line IO may extend in the second direction Z2 from between the protruding region Fa and the connection region 60a (extending parallel to each other).

The insulating frame F may include the first partition wall W1 erected or extending upwardly in the third direction Z3 to face the battery cell 10 (e.g., the body 10c of the battery cell 10) on the base portion Fb (on the terrace portion T). The first partition wall W1 may block the battery cell 10 between the circuit portion C and the battery cell 10, and thus may effectively block a contact between the circuit portion C and the battery cell 10 and provide insulation therebetween. In an implementation, the first partition wall W1 may block a contact between the connection tab 50 in the circuit portion C and the battery cell 10, and may provide insulation therebetween. As will be described below, the safety element D of the circuit portion C may also be insulated by a separate insulating block B. In an implementation, the connection tab 50 of the circuit portion C may be exposed to the outside of the protection module package P for connection with the electrodes 11 and 12 of the battery cell 10, and insulation of the connection tab 50 may be provided by the first partition wall W1 between the connection tab 50 and the battery cell 10. An avoidance groove OP (for avoiding physical interference with the insulating block B) may be in the first partition wall W1. In an implementation, the first partition wall W1 may extend in the first direction Z1, and the avoidance groove OP for avoiding physical interference with the insulating block B surrounding the safety element D may be at a central position in which the safety element D is arranged in the first direction Z1. The avoidance groove OP may be open upwardly from a central position of the first partition wall W1.

The first partition wall W1 may extend (e.g., lengthwise) in the first direction Z1 and may be at a rear position of the insulating frame F in the second direction Z2. In an implementation, the connection tab 50 may be at a front position of the insulating frame F, e.g., opposite to the first partition wall W1. In an implementation, the connection tab 50 and the first partition wall W1 may be respectively at the front and rear positions of the insulating frame F, e.g., the connection tab 50 and the first partition wall W1 may be respectively at the front and rear positions of the base portion Fb of the insulating frame F. In an implementation, the connection tab 50 may be at the front position of the insulating frame F, e.g., in the connection tab 50, rather than the fixing piece 51 (which is fixed to the circuit board 60), the coupling piece 52 may be on the fixing piece 51 and relatively vulnerable to insulation from the external environment at the front position of the insulating frame F. In an implementation, the connection tab 50 may be at the front position of the insulating frame F, e.g., the bending portion 55 connecting the fixing piece 51 to the coupling piece 52 may be at the front position of the insulating frame F.

In an implementation, the bending portion 55 or the coupling piece 52 (extending from the bending portion 55) may be at a front position of the insulating frame F, and the first partition wall W1 may block the battery cell 10 (e.g., the body 10c of the battery cell 10) at a rear position of the insulating frame F, and a contact between the coupling piece 52 and the battery cell 10 may be effectively blocked and insulation therebetween may be provided.

Referring to FIG. 4, for the connection between the coupling piece 52 and the electrodes 11 and 12 of the battery cell 10, the coupling piece 52 may be connected to the electrodes 11 and 12 of the battery cell 10 in a state of being erected (e.g., extending upwardly) in the third direction Z3 from the fixing piece 51 (fixed to the circuit board 60). In an implementation, the coupling piece 52 may be at a front position of the insulating frame F. The coupling piece 52 may be connected to the electrodes 11 and 12 of the battery cell 10 and may be bent around or at the bending portion 55 to overlap the fixing piece 51 fixed to the circuit board 60. In an implementation, in a state where the fixing piece 51 and the coupling piece 52 overlap each other, the bending portion 55 connecting the fixing piece 51 to the coupling piece 52 may be at a front position of the insulating frame F.

In an implementation, the first partition wall W1 may be at a rear position (opposite to the front position) of the insulating frame F (e.g., at which the bending portion 55 of the connection tab 50 is formed or arranged). Thus, an avoidance space G may be between the first partition wall W1 and the coupling piece 52 extending from the bending portion 55, the first partition wall W1 and the coupling piece 52 being apart from each other in front and rear directions. The avoidance space G may help prevent the first partition wall W1 from being damaged by welding between the electrodes 11 and 12 of the battery cell 10 and the coupling piece 52, which overlap each other. In an implementation, the electrodes 11 and 12 of the battery cell 10 and the coupling piece 52, which overlap each other, may be coupled to each other through laser welding, and the first partition wall W1 may be spaced apart from the coupling piece 52 by the avoidance space G, and may not be damaged by the welding heat of the coupling piece 52.

The electrodes 11 and 12 of the battery cell 10 and the coupling piece 52 may overlap each other in a state of being erected (e.g., extending upwardly) in the third direction Z3 from the base portion Fb of the insulating frame F. In an implementation, the electrodes 11 and 12 of the battery cell 10 and the coupling piece 52 may be arranged in a state of being erected or extending upwardly at a position in front of the insulating frame F, and may be welded to each other by a laser irradiated in a front-rear direction (e.g., in the second direction Z2). In an implementation, the first partition wall W1 may extend in the third direction Z3 at a rear position of the insulating frame F, and the first partition wall W1 may be spaced apart from the coupling piece 52 in a front position of the insulating frame F with the avoidance space G therebetween. Accordingly, the welding heat transferred from the coupling piece 52 may be transferred to the avoidance space G and may not be transferred directly to the first partition wall W1.

In an implementation, the electrodes 11 and 12 of the battery cell 10 and the coupling piece 52, which are coupled to each other in a state of being erected in the third direction Z3 from the insulating frame F (e.g., from the base portion Fb of the insulating frame F), may overlap the circuit board 60 on the base portion Fb while being bent toward the base portion Fb. In an implementation, the electrodes 11 and 12 of the battery cell 10 and the coupling piece 52, which may be coupled to each other, may then be folded toward the fixing piece 51 fixed to the circuit board 60, and may overlap the fixing piece 51 of the circuit board 60. In an implementation, the electrodes 11 and 12 of the battery cell 10 and the coupling piece 52, which are coupled to each other, may overlap the fixing piece 51 and may be insulated from external environment through attachment of an insulating tape while overlapping the fixing piece 51, and separation from the fixing piece 51 may be prevented.

Referring to FIGS. 3 to 7, in an embodiment, the insulating frame F may include the base portion Fb on the terrace portion T, a first partition wall W1 erected in the third direction Z3 on or from the base portion Fb to face the battery cell 10, and a second partition wall W2 surrounding the circuit portion C together with the first partition wall W1 on the base portion Fb. The base portion Fb and the first and second partition walls W1 and W2 may form an accommodation space for the circuit portion C while being connected to each other.

In an implementation, the first and second partition walls W1 and W2 may surround (e.g., at least partially surround) the circuit portion C. In an implementation, the first and second partition walls W1 and W2 may open at the front of the circuit portion C so as not to interfere with the electrodes 11 and 12 of the battery cell 10, which are drawn out from the battery cell 10 in the second direction Z2 and connected to the connection tab 50 through the front of the circuit portion C. In an implementation, the first and second partition walls W1 and W2 may be formed on the rear of the circuit portion C facing the battery cell 10 (e.g., the body 10c of the battery cell 10) and on the side connected to the rear of the circuit portion C, and thus may surround the rear and side of the circuit portion C. In an implementation, the front of the circuit portion C may be opened for connection with the electrodes 11 and 12 of the battery cell 10, and the circuit portion C may be protected and insulated from the external environment by providing the first and second partition walls W1 and W2 surrounding the rear and side of the circuit portion C.

Referring to FIG. 1, the first partition wall W1 may block the battery cell 10 (e.g., the body 10c of the battery cell 10) at the rear of the circuit portion C, thereby providing electrical insulation between the circuit portion C and the battery cell 10. In an implementation, the casing 10b forming the outer surface of the battery cell 10 may include a metal thin film, and may insulate the circuit portion C from the battery cell 10 through the first partition wall W1 arranged to block the battery cell 10.

In an implementation, the protection module package P may have a shorter length than the terrace portion T in the first direction Z1, and may be at a central position of the terrace portion T, spaced apart from a side sealing portion S at both edges of the terrace portion T. The metal thin film of the casing 10b may be exposed to a cross-section of the side sealing portion S. The protection module package P according to an embodiment of the disclosure may be on the central position of the terrace portion T, spaced apart from both edges of the terrace portion T at which the side sealing portion S is arranged, thereby blocking a contact and electrical interference with the side sealing portion S. The protection module package P according to an embodiment of the disclosure may have a compact configuration, the protection module package P may have a shorter length than the terrace portion T of the battery cell 10 in the first direction Z1, and thus may help reduce physical and electrical interference with peripheral components such as the side sealing portion S and provide an extra mounting space for other configurations through an extra space on the terrace portion T.

Referring to FIGS. 3 to 7, in an embodiment of the disclosure, the second partition wall W2 may surround the side of the circuit portion C while extending in the second direction Z2 opposite to or away from the battery cell 10 and outwardly from both outer edges of the first partition wall W1. In an implementation, the second partition wall W2 may be formed in a pair on or at both outer edges of the first partition wall W1 to surround both sides of the circuit portion C that face each other in the first direction Z1. In an implementation, the second partition wall W2 may form an accommodation space of the circuit portion C together with the first partition wall W1 (while extending in the second direction Z2 from both edges of the first partition wall W1), and may form the insulating frame F providing an accommodation space of the circuit portion C together with the base portion Fb by which the first and second partition walls W1 and W2 are supported. The insulating frame F may form an accommodation space for the circuit portion C while surrounding the lower side, the rear, and the side of the circuit portion C, and for connection with the electrodes 11 and 12 of the battery cell 10, may form an accommodation space opened toward the front and upper side of the circuit portion C. In addition, the input/output line IO may extend through the front of the circuit portion C, which is opened.

The circuit portion C may include a circuit board 60, and a safety element D and a connection tab 50 arranged on the circuit board 60. The connection tab 50 may be formed in an exposed state for connection with the electrodes 11 and 12 of the battery cell 10, and may be exposed to the outside of the protection module package P to allow connection with the electrodes 11 and 12 of the battery cell 10.

The safety element D may be protected or insulated from the external environment by being surrounded or covered by the insulating block B. In an implementation, the insulating block B may surround the safety element D on the circuit board 60 (on which the safety element D is arranged), and may entirely surround or cover the entire outer surface, except for the bottom of the safety element D connected to the circuit board 60. The insulating block B may be formed separately from the insulating frame F. In an implementation, the insulating block B may be formed on the insulating frame F, e.g., may be formed on the circuit board 60 seated on the insulating frame F and be separated from the insulating frame F with the circuit board 60 therebetween. The insulating block B and the insulating frame F may each include an insulating resin material, and may include the same insulating resin material. In an implementation, the insulating block B may be on the circuit board 60 on the insulating frame F and be separated from the insulating frame F. The insulating block B may cover the safety element D at a central position of the circuit board 60 in the first direction Z1, and the connection region 60a at a position adjacent to the safety element D, and thus may protect and insulate the safety element D and the connection region 60a from the external environment. In an implementation, the insulating block B may include a portion covering the safety element D on the circuit board 60 while extending in the first direction Z1, and a portion covering the connection region 60a of the circuit board 60 while extending in the second direction Z2.

Hereinafter, a method of manufacturing a battery pack, according to an embodiment of the disclosure, will be described with reference to FIGS. 2 and 4.

The method of manufacturing a battery pack, according to an embodiment of the disclosure, may be used to manufacture the battery pack including the battery cell 10 including the terrace portion T from which the electrodes 11 and 12 are drawn out, the circuit portion C including the connection tab 50 connected to the electrodes 11 and 12 of the battery cell 10, and the insulating frame F including the base portion Fb on the terrace portion T of the battery cell 10 and the first partition wall W1 on the base portion Fb to face the battery cell 10 (e.g., the body 10c of the battery cell 10).

In an implementation, the method may include, e.g., in a state in which the connection tab 50 is erected (e.g., extends upwardly in the third direction Z3) to face (e.g., in parallel with) the first partition wall W1, with the avoidance space G between the connection tab 50 and the first partition wall W1, connecting the electrodes 11 and 12 of the battery cell 10 to the connection tab 50, and bending the connection tab 50 and the electrodes 11 and 12 of the battery cell 10, which are connected to each other, to be seated on the floor of the avoidance space G (e.g., on the fixing piece 51).

In an implementation, the connection tab 50 (e.g., the coupling piece 52 of the connection tab 50) may be at a front position of the insulating frame F (in or relative to the second direction Z2), and the first partition wall W1 may be at a rear position of the insulating frame F. In an implementation, in a state in which the connection tab 50 at the front position of the insulating frame F is erected in the third direction Z3, an avoidance space G may be between the connection tab 50 at the front position of the insulating frame F and the first partition wall W1 at the rear position of the insulating frame F. In an implementation, the connection tab 50 being at the front position of the insulating frame F may mean that the coupling piece 52 of the connection tab 50 is at the front position, and may mean that the coupling piece 52 or the bending portion 55 (from which the coupling piece 52 extends) may be at the front position. In an implementation, the connection tab 50 and the first partition wall W1 being at the front position and the rear position of the insulating frame F, respectively, may mean that the connection tab 50 and the first partition wall W1 are arranged at the front position and the rear position of the base portion Fb of the insulating frame F, respectively.

In an implementation, an electrical connection between the battery cell 10 and the circuit portion C may be made by coupling the electrodes 11 and 12 of the battery cell 10 to the connection tab 50 of the circuit portion C by using welding or the like in a state in which the electrodes 11 and 12 of the battery cell 10 and the connection tab 50 of the circuit portion C are arranged to overlap each other. In an implementation, the electrodes 11 and 12 of the battery cell 10 may extend through the bottom of the protection module package P, surround the protection module package P, and overlap the connection tab 50 at the front of the circuit portion C. In an implementation, the connection tab 50 (e.g., the coupling piece 52 of the connection tab 50) may overlap the electrodes 11 and 12 of the battery cell 10 in a state of being erected in the third direction Z3, and the connection tab 50 and the electrodes 11 and 12 of the battery cell 10 may be coupled to each other through welding. In an implementation, the connection tab 50 and the electrodes 11 and 12 of the battery cell 10, which overlap each other at the front position of the insulating frame F, may be spaced apart from the first partition wall W1 (at the rear position of the insulating frame F) with an avoidance space G therebetween. Thus, damage to the first partition wall W1 at the rear position, e.g., which could otherwise be caused by welding performed at the front position of the insulating frame F, may be prevented. In an implementation, in the connection between the battery cell 10 and the circuit portion C, the electrodes 11 and 12 of the battery cell 10 and the connection tab 50 (e.g., the coupling piece 52 of the connection tab 50), which overlap each other, may be arranged to face the first partition wall W1 while being erected in the direction Z3, and an avoidance space G may be between the electrodes 11 and 12 and connection tab 50 and the first partition wall W1, arranged to face each other. Thus, damage to the first partition wall W1 may be prevented. In an implementation, the electrodes 11 and 12 of the battery cell 10 and the connection tab 50, connected to each other, may be bent together toward the bottom of the avoidance space G. In an implementation, the electrodes 11 and 12 of the battery cell 10 and the coupling piece 52 of the connection tab 50, connected to each other, may overlap each other on the circuit board 60 (which forms the bottom of the avoidance space G). In an implementation, the electrodes 11 and 12 of the battery cell 10 and the coupling piece 52 of the connection tab 50, connected to each other, may overlap the fixing piece 51 fixed to the circuit board 60, and may be insulated from an external environment through attachment of an insulating tape in a state in which they overlap the fixing piece 51, and separation from the fixing piece 51 may be prevented.

According to the disclosure, a battery pack including a compact protection module package including a circuit portion electrically connected to a battery cell and providing insulation of the circuit portion, may be provided.

One or more embodiments may provide a battery pack including a circuit portion electrically connected to a battery cell and a compact protection module package that provides insulation of the circuit portion.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a battery cell including a terrace portion from which an electrode is drawn out;
a protection module package electrically connected to the battery cell; and
an input/output line,
wherein the protection module package includes:
an insulating frame including:
a base portion on the terrace portion of the battery cell, and
a first partition wall extending vertically from an edge of the base portion and facing the battery cell such that the first partition wall extends in a plane perpendicular to a plane of the base portion,
a circuit portion on the insulating frame, and
an insulating block covering only a portion of the circuit portion such that the covered portion of the circuit portion is between the base portion and the insulating block and uncovered portions of the circuit portion are at sides of the insulating block in a first direction, the first direction being a lengthwise direction of the terrace portion,
wherein:
the circuit portion includes:
a circuit board, the circuit board being a support base of the circuit portion,
a connection tab on the circuit board and connected to the electrode of the battery cell, and
a safety element on the circuit board and connected to the connection tab,
the circuit board includes a connection region protruding in a second direction intersecting with the first direction,
the base portion of the insulating frame includes a protruding region protruding in the second direction in parallel with the connection region and supporting the connection region,
the input/output line is connected to the connection region of the circuit board,
the input/output line extends between the connection region of the circuit board and the base portion,
the connection region protrudes from a central position of the circuit board, the central position of the circuit board being at a center of the circuit board in the first direction, and
the insulating block covers both the safety element and the connection region,
wherein the insulating block is separated from the insulating frame with the circuit board therebetween, and
the insulating block covers an entire outer surface of the safety element except for a bottom of the safety element, which is connected to the circuit board.

2. The battery pack as claimed in claim 1, wherein the base portion is between the terrace portion and the circuit portion.

3. The battery pack as claimed in claim 1, wherein the first partition wall is between a body of the battery cell and the circuit portion.

4. The battery pack as claimed in claim 1, wherein:
the base portion, the first partition wall, and the terrace portion each extend in the first direction in parallel with one another, and
the electrode is drawn out from the terrace portion in the second direction.

5. The battery pack as claimed in claim 1, wherein:
the safety element is at the central position of the circuit board in the first direction, which is a lengthwise direction of the circuit board, and
the connection tab includes a first connection tab and a second connection tab at respective sides of the safety element.

6. The battery pack as claimed in claim 1, wherein the insulating frame further includes a second partition wall on the base portion thereof, the second partition wall and the first partition wall together at least partially surrounding the circuit portion.

7. The battery pack as claimed in claim 6, wherein:
the electrode of the battery cell is connected to the circuit portion at a front of the circuit portion, and
the first partition wall and the second partition wall at least partially surround a rear and a side of the circuit portion.

8. The battery pack as claimed in claim 7, wherein the first partition wall and the second partition wall and the base portion are connected to each other, surround the rear, the side, and a bottom of the circuit portion, and form an accommodation space for the circuit portion.

9. The battery pack as claimed in claim 6, wherein:
the first partition wall extends in the first direction, and
the second partition wall extends in the second direction, away from the battery cell, from both outer edges of the first partition wall.

10. The battery pack as claimed in claim 1, wherein:
the connection tab is at a front position of the insulating frame and the first partition wall is at a rear position of the insulating frame relative to the second direction.

11. The battery pack as claimed in claim 10, wherein an avoidance space is between the connection tab and the first partition wall, which face each other and extend upwardly in a third direction intersecting with the first and second directions.

12. The battery pack as claimed in claim 10, wherein:
the connection tab includes:
a fixing piece fixed on a circuit board of the circuit portion, a coupling piece connected to the electrode of the battery cell, and a bending portion connecting the fixing piece to the coupling piece, and the bending portion is at the front position of the insulating frame.

13. A method of manufacturing the battery pack as claimed in claim 1, the method comprising:

connecting the connection tab to the electrode of the battery cell in a state in which the connection tab extends upwardly and faces the first partition wall with an avoidance space between the connection tab and the first partition wall; and bending the connection tab and the electrode of the battery cell, connected to each other, to then be seated on a floor of the avoidance space.

14. The method as claimed in claim 13, wherein:

the connection tab includes a fixing piece fixed on a circuit board of the circuit portion, a coupling piece connected to the electrode of the battery cell, and a bending portion connecting the fixing piece to the coupling piece, and bending the connection tab and the electrode of the battery cell includes bending the coupling piece, which has been connected to the electrode of the battery cell, around the bending portion to overlap the fixing piece.

* * * * *